United States Patent [19]

Gossen et al.

[11] Patent Number: 5,672,199

[45] Date of Patent: Sep. 30, 1997

[54] WATER-CONTAINING ANTISLIP COMPOSITION

[75] Inventors: Ralf Gossen, Duisburg; Bernhard Herlfterkamp, Bottrop; Ludwig Broich, Duesseldorf; Horst Buxhofer, Erkrath; Hermann Onusseit, Haan, all of Germany

[73] Assignee: Henkel Kommanditgesellschaft auf Aktien, Duesseldorf, Germany

[21] Appl. No.: 648,099

[22] PCT Filed: Nov. 11, 1994

[86] PCT No.: PCT/EP94/03744

§ 371 Date: May 20, 1996

§ 102(e) Date: May 20, 1996

[87] PCT Pub. No.: WO95/14748

PCT Pub. Date: Jun. 1, 1995

[30] Foreign Application Priority Data

Nov. 20, 1993 [DE] Germany ............... 43 39 642.9

[51] Int. Cl.$^6$ ............................................. C09K 3/14
[52] U.S. Cl. ................... 106/36; 106/133; 106/135; 106/144; 106/146; 106/160; 106/173.1; 106/189; 106/200; 106/203; 106/207; 106/208; 106/212; 106/213; 106/237; 106/238; 523/150; 524/270; 524/379; 427/385.5
[58] Field of Search ............... 106/36, 133, 128, 106/144, 173.1, 189, 207, 212, 236, 237, 238, 213, 135, 146, 160, 200, 203, 208, 197.1, 126, 129, 130, 157, 138, 139, 141, 158, 161; 427/385.5, 421; 524/270, 379; 523/150; 428/497

[56] References Cited

U.S. PATENT DOCUMENTS

| | | | |
|---|---|---|---|
| 2,698,250 | 12/1954 | Leichner | 106/36 |
| 2,921,918 | 1/1960 | Mooney et al. | 106/36 |
| 3,598,677 | 8/1971 | Bergmeister et al. | 156/276 |
| 3,734,801 | 5/1973 | Sebel | 156/309 |
| 3,755,044 | 8/1973 | Sebel | 156/289 |
| 4,563,218 | 1/1986 | Schuler | 106/36 |
| 5,453,219 | 9/1995 | Smrt et al. | 106/36 |

FOREIGN PATENT DOCUMENTS

| | | |
|---|---|---|
| 12 62 897 | 12/1965 | Germany . |
| 19 17 566 | 12/1970 | Germany . |
| 19 43 731 | 3/1971 | Germany . |
| 19 43 732 | 3/1971 | Germany . |
| 20 31 881 | 1/1972 | Germany . |
| 22 40 608 | 2/1974 | Germany . |
| 1566 12 | 2/1981 | Germany . |
| 200 089 | 3/1983 | Germany . |
| 33 35 522 | 4/1985 | Germany . |
| 42 30 472 | 3/1994 | Germany . |
| 59-172569 | 9/1984 | Japan . |
| 6 136 304 | 5/1994 | Japan . |

*Primary Examiner*—Michael Marcheschi
*Attorney, Agent, or Firm*—Wayne C. Jaeschke; John Daniel Wood; Daniel S. Ortiz

[57] ABSTRACT

A composition useful as an antislip for articles with plastic surfaces is provided. Said composition typically comprises from 35 to 45% by weight of a rosin or derivative thereof, preferably a water-soluble, saponified rosin, from 5 to 10% by weight of an alcohol, preferably selected from the group consisting of ethane-1,2-diol, propane-1,2-diol and propane-1,2,3-triol, from 5 to 10% by weight of a liquefying agent, preferably selected from the group consisting of alkali metal alkyl benzenesulfonates containing up to 8 carbon atoms in the alkyl chain and alkaline earth metal alkyl benzenesulfonate containing up to 8 carbon atoms in the alkyl chain, optionally from 15 to 25% by weight of a propellant, e.g. dimethyl ether, optionally from 0.5 to 5% by weight of a water-soluble polymer selected from the group consisting of one or more of the following substances: starch, starch derivatives, dextrin, polyurethane, and cellulose ethers, and the balance water.

26 Claims, No Drawings

WATER-CONTAINING ANTISLIP COMPOSITION

CROSS REFERENCE TO RELATED APPLICATION

This application is a 371 of international application number PCT/EP94/03744, filed Nov. 11, 1994.

BACKGROUND OF THE INVENTION

1. Field of the Invention

This invention relates to a water-containing antislip composition and to its use for non-absorbent articles.

2. Discussion of Related Art

Antislip compositions are intended to prevent two articles from slipping, i.e. unintentionally sliding, relative to one another, but at the same time to enable them to be readily separated from one another. This is generally achieved by the antislip composition offering high resistance to movements in the sliding direction while offering no resistance or such little resistance to movements perpendicularly of that direction that the surfaces of the separated articles are not damaged. The raw material base for these antislip compositions are generally natural or synthetic macromolecular substances of the type also used for adhesives. Similarly to adhesives, antislip compositions may also be applied to an article to be secured from the melt, i.e. free from evaporating solvents or dispersants (see, for example, DE-A-19 17 566). This process requires special equipment for melting and applying the antislip composition. It is more normal to apply the macromolecular substances in the form of a solution in organic solvents or in the form of an aqueous dispersion.

In cases where antislip compositions are used for water-absorbing articles, for example packs of cardboard, paperboard or paper, or for the coating of carpets, they are now generally based on aqueous solutions or dispersions. Thus, DE-C-19 43 731 describes the use of aqueous solutions of the colloid xanthan gum as adhesives for packaging materials. DE-C-12 62 897 proposes the use of aqueous dispersions of polymers of olefinically unsaturated compounds, more especially polyvinyl acetates and copolymers thereof. According to DE-C-20 31 881, aqueous dispersions of paraffins and/or polyalkylenes may also be used. DD 156 612 describes a process for the backing of carpets in which a solid, transparent, non-tacky and non-slip finish is applied to the carpet. To this end, a low-viscosity mixture of a copolymer latex of butadiene/styrene and/or butadiene/acrylonitrile with powder-form polyvinyl chloride having a solids content of 40 to 55% is prepared, applied to the back of the carpet and subsequently dried. The addition of the polyvinyl chloride to the butadiene copolymer reduces its otherwise troublesome tackiness without affecting the favorable non-slip behavior on various types of flooring, such as wood, xylolith and plastic. The coating mixture shows very good adhesion to natural and synthetic fibers.

Antislip compositions based on an organic solution of polymers or resins are generally used for non-water-absorbent articles. Thus, JP-A-59172569 proposes solutions of ethylene/vinyl acetate copolymers and a hydrogenated glycidyl ester of rosin (Ester Gum H) in toluene for use in aerosol packs. Other conventional antislip compositions use chlorinated hydrocarbons, such as methylene chloride, as solvents for rosin or synthetic polymers, such as polybutadiene.

In order to guarantee ease of application from aerosol cans, these solutions must not exceed a certain viscosity (around 1,000 mPa.s), so that only solutions with a relatively low solids content can be used, i.e. considerable quantities of organic solvents are released during application. Accordingly, for hygiene and ecological reasons, there is a considerable need for adhesives which preferably release only small quantities, if any, of organic solvents during their application, in addition to which these relatively small quantities of organic solvents, if technically unavoidable, should be safe from the point of view of factory hygiene and the environment.

German patent application P 42 30 472.5 filed Sep. 14, 1992 describes an antislip composition for articles which do not absorb water. It contains a) a polymer, more especially a polymer of olefinically unsaturated compounds, b) an alcohol, more especially a monohydric alcohol containing 1 to 4 carbon atoms, c) a propellent, more especially a mixture of propane and butane and/or dimethyl ether, and d) water-soluble or water-dispersible additives, more particularly a protective colloid, a defoamer and/or a re-emulsifier.

The problem addressed by the invention was to provide antislip compositions which would not have any of these disadvantages, i.e. which could be applied without difficulty even to non-water-absorbing articles with plastic surfaces, and which would lead to a highly temperature-resistant and water-soluble antislip composition, which would contain as solvents and/or dispersants water or aqueous solutions of hygienically and/or ecologically safe organic solvents without impairing handling or performance properties and which could optionally be applied from aerosol cans.

SUMMARY OF THE INVENTION

The solution to this problem as provided by the invention is an aqueous solution or dispersion of A) a rosin and/or a derivative thereof, B) a monohydric or polyhydric alcohol and C) a liquifying agent.

Accordingly, the water-containing antislip composition according to the invention for articles with plastic surfaces contains A) at least one rosin and/or a derivative thereof, B) at least one monohydric or polyhydric alcohol, C) a water-soluble or water-dispersible liquifying agent, D) optionally a propellent, E) optionally at least one water-soluble polymer from the group consisting of gelatine, alginates, xanthan gum, gum arabic, starch, starch derivatives, dextrin, cellulose ethers, casein, polyvinyl pyrrolidone, polyacrylic acid, polyvinyl methyl ether, polyurethane and polyvinyl acetate, and F) water.

DETAILED DESCRIPTION OF THE INVENTION

The rosin is an amorphous glass-like material with average molecular weights below 2,000 g/mole. It is obtained from the crude resin of conifers. It consists mainly of unsaturated carboxylic acids with the empirical formula $C_{20}H_{30}O_2$, such as abietic acid and isomers thereof. In addition, however, more or less neutral substances, such as fatty acid esters, terpene alcohols and hydrocarbons, may also be present. A derivatized rosin, for example a hydrogenated or disproportionated rosin, is preferably used, the derivatization serving above all to increase solubility in water, for example the saponification or addition of maleic acid. Useful rosins and derivatives thereof are gum rosin, liquid rosin and wood rosin. Water-soluble gum rosin derivatives with a solubility of at least 3 g in 100 g of water at 25° C. are particularly suitable. Water-soluble rosin derivatives, more especially saponified derivatives, are preferably used.

The monohydric or polyhydric alcohols not only serve as solubilizers, they are also crucial to the adhesion of the antislip composition to the plastic surface. Accordingly, they are preferably liquid and evaporate at 25° C. from the adhesive system in accordance with practical requirements. Alcohols with a solubility of more than 3 g in 100 g of water at 25° C. are preferably used. The alcohols may be aliphatic or cycloaliphatic, saturated or unsaturated hydrocarbons with a linear or branched chain. They may also contain other hetero atoms, for example O in the form of an ether group. Specific examples are methanol, ethanol, propanol, butanol, benzyl alcohol, cycylohexanol, di-, tri- and polyethylene glycol. Dihydric and polyhydric alcohols, more particularly ethane-1,2-diol, propane-1,2-diol and/or propane-1,2,3-triol, are preferably used.

Suitable liquifying agents are any alkali metal or alkaline earth metal alkyl benzene sulfonates containing up to 18 carbon atoms and preferably up to 8 carbon atoms in the alkyl chain, more particularly, 1 to 4 carbon atoms in the alkyl chain, more particularly the sodium salt of propyl benzene sulfonate.

In the interests of environmental safety, halogenated hydrocarbons are now no longer used as propellents for aerosol packs. Among the standard propellent gases known per se, propane, butane or mixtures thereof, optionally with ethanol, more especially dimethyl ether, are used. However, $CO_2$ may also be used.

The water-soluble polymers are at least one of the following natural or synthetic polymers: gelatine, alginates, glutin, xanthan gum, gum arabic, starch, starch derivatives, dextrin, cellulose ethers, casein, polyvinyl pyrrolidone, polyvinyl acrylic acid, polyvinyl methyl ether, polyvinyl acetate, polyurethane and polyvinyl alcohol. Suitable starch derivatives are those obtained by reaction of native or degraded starch, for example oxidation-degraded starch. These starch derivatives are generally reaction products with, for example, ethylene oxide, propylene oxide, acrylonitrile, chloroacetic acid or even epoxypropanesulfonic acid. The degree of substitution should be relatively low, for example from 0.02 to 0.1 DS. The dextrin used may be commercially available thin-boiling, medium-boiling or thick-boiling dextrin which can be obtained in known manner by degradation of starch. Starch, starch derivatives, dextrin and cellulose ethers are preferably used.

In order favorably to influence certain processing properties of the antislip compositions, other additives, such as commercial defoamers, antiagers and/or re-emulsifiability promoters for the dried film, may be added. Examples of re-emulsifiability promoters are urea, organic amines, for example triethanolamine, and/or similar compounds.

The concentration of the individual components in the antislip formulation is generally 10 to 60 and preferably 35 to 45% by weight of component A), 2 to 20 and preferably 5 to 10% by weight of component B), 2 to 20 and preferably 5 to 10% by weight of component C), 0 to 35 and preferably 15 to 25% by weight of component D) and 0 to 10 and preferably 0.5 to 5% by weight of component E).

The rest is water. Under particular conditions, one component may even be outside the preferred ranges, for example when the drying rate is increased or reduced by climatic influences (variation of the alcohol content)

the contact surface is reduced or increased in size by large or small surface structures (variation of the polymer content).

For application from an aerosol can, the viscosity of the antislip composition without a propellent gas should be in the range from 100 to 3,000 and, more particularly, in the range from 500 to 1,000 mPa.s (Brookfield, 23° C., spindle 3, 20 r.p.m.).

The pH value of the antislip composition is adjusted with alkali or ammonia to a value in the range from 7 to 10 and preferably to a value in the range from 8.5 to 9.5. In a preferred embodiment, the antislip composition does not contain any halogenated organic solvents.

The solids content of the antislip composition is generally from 40 to 60% by weight and more particularly from 50 to 55% by weight. However, it may even be outside these ranges, for example where a longer evaporation time is acceptable at lower solids contents or the evaporation time becomes shorter at higher solids contents.

The production of the antislip composition from the individual components is easy and does not present any difficulties to the expert because it is carried out in the usual way with usual means.

The antislip composition is also applied to the articles in known manner, for example by roll coating, spray coating or brush coating, but preferably by spraying from an aerosol can using a propellent. It is important that the surfaces are dry before the articles are stacked on top of one another.

The antislip compositions according to the invention are suitable both for the treatment of water-absorbing articles and for the antislip treatment of non-water-absorbing articles of metals or plastics. The plastics are, for example, polystyrene, polycarbonate, polyvinyl chloride and polyethylene terephthalate. However, polyethylene and polypropylene can also be effectively provided with an antislip finish.

It has surprisingly been found that the antislip compositions according to the invention have a number of favorable processing properties:

rapid drying of the film of antislip composition ready redispersibility of the film after drying, hence no blockage of the spray nozzle high strength of adhesion to non-absorbent substrates such as, for example, sacks of polyethylene or polypropylene, despite which the bonds can readily be broken without damaging the substrates the adhesive film is transparent and does not leave behind any brittle and crumbly residues on drying the mixtures do not show any tendency to coagulate or sediment.

Although the compositions according to the invention are preferably used as antislip compositions, this application may be regarded purely as an example; other applications where "measured adhesive strength" is required are also encompassed by the invention and include, for example, application during the winding of a web onto a tube, the web or the tube consisting of plastic or of paper or paperboard.

The following Examples are intended to illustrate the invention.

EXAMPLE 1 (in parts by weight)

1) 42% Resitherm CA-HE
2) 15% water
3) 10% potassium hydroxide (50% in water)
4) 7% glycerol
5) 25% Na cumenesulfonate (40% in water)
6) 1% H₂O₂ (35% in water)

Resitherm CA-HE is a rosin with an acid value of around 160 and a saponification value of around 170.

The above components were mixed in the following order in standard mixers: components 1, 2 and 3 were introduced first and heated to around 85° C. After cooling to 40° to 80° C., components 4 and 5 were added. The viscosity was adjusted with water to the required value. Finally, the composition was bleached with component 6. The viscosity of the composition measured 1,800 mPa.s at 25° C. It had a pH value of 8.5 and a solids content of 65%.

The active substance (75 parts by weight) was packed in the usual way with the propellent dimethyl ether (25 parts by weight) in aerosol cans.

Depending on the quantity applied and the climatic conditions, an antislip effect sufficient for subsequent processing was obtained, even on polyethylene, after only 30 to 90 s (20° C./60% relative air humidity). The foam collapsed very quickly.

EXAMPLE 2

As in Example 1, an antislip composition for aerosol cans was prepared from the following components:

1) 46.0% by weight modified liquid rosin,
2) 18.75% by weight water
3) 7% sodium hydroxide (50% in water)
4) 9% glycerol
5) 9% Na cumenesulfonate (solid)
6) 0.25% by weight defoamer
7) 10% by weight ethanol The composition had a viscosity of 800 mPa.s at 25° C., a pH value of 9 and a solids content of 67%. 75 Parts by weight of the composition were conventionally packed in aerosol cans with 25 parts by weight of dimethyl ether. Virtually the same results as in Example 1 were obtained.

What is claimed is:

1. An antislip composition comprising:
   (A) 10–60% by weight of at least one rosin or a derivative thereof;
   (B) 2–20% by weight of at least one alcohol selected from the group consisting of monohydric alcohols and polyhydric alcohols;
   (C) 2% to 20% by weight of a liquifying agent which is water-soluble or water-dispersible and comprises at least one compound selected from the group consisting of alkali metal alkyl benzenesulfonates containing up to 8 carbon atoms in the alkyl chain and alkaline earth metal alkyl benzenesulfonates containing up to 8 carbon atoms in the alkyl chain;
   (D) 0 to 35% by weight of a propellant;
   (E) 0 to 10% by weight of a water-soluble polymer; and
   (F) water.

2. The composition as claimed in claim 1 wherein (A) comprises a water-soluble rosin derivative.

3. The composition as claimed in claim 2 wherein said rosin derivative is a saponified rosin.

4. The composition as claimed in claim 1 wherein said alcohol is selected from the group consisting of ethane-1,2-diol, propane-1,2-diol and propane-1,2,3-triol.

5. The composition as claimed in claim 1 comprising 15% to 25% by weight of a propellant.

6. The composition as claimed in claim 5 wherein said propellant is dimethyl ether.

7. The composition as claimed in claim 1 comprising from 0.5% to 5% by weight of at least one water-soluble polymer comprising gelatin, alginates, xanthan gum, gum arabic, starch, starch derivatives, dextrin, cellulose ethers, casein, polyvinyl pyrrolidone, polyacrylic acid, polyvinyl methyl ether, polyurethane or polyvinyl acetate.

8. The composition as claimed in claim 7 wherein said water-soluble polymer comprises starch, starch derivatives, dextrin, polyurethanes or cellulose ethers.

9. The composition as claimed in claim 1 wherein said composition has a pH value of 7 to 10.

10. The composition as claimed in claim 1 wherein said composition has a pH value of 8.5 to 9.5.

11. The composition as claimed in claim 1 wherein said composition has a viscosity of 100 to 3,000 mPa.s when measured without a propellant.

12. The composition as claimed in claim 1 wherein said composition has a viscosity of 500 to 1,000 mPa.s when measured without a propellant.

13. The composition as claimed in claim 1 wherein said composition contains from 35% to 45% by weight of said rosin or derivative thereof, from 5% to 10% by weight of said alcohol, from 5% to 10% by weight of said liquefying agent.

14. The composition as claimed in claim 13 wherein said composition comprises: from 15% to 25% by weight of a propellant, from 0.5% to 5.0% by weight of at least one water-soluble polymer comprising gelatin, alginates, xanthan gum, gum arabic, starch, starch derivatives, dextrin, cellulose ethers, casein, polyvinyl pyrrolidone, polyacrylic acid, polyvinyl methyl ether, polyurethane, or polyvinyl acetate.

15. A composition as claimed in claim 1 wherein said rosin comprises a gum rosin having a water-solubility of at least 3 grams in 100 grams of water at 25° C.

16. The composition as claimed in claim 1 wherein said alcohol has a solubility in water of more than 3 grams in 100 grams of water at 25° C.

17. The composition as claimed in claim 1 wherein said alcohol is selected from the group consisting of methanol, ethanol, propanol, butanol, benzyl alcohol, cycylohexanol, di-, tri- and polyethylene glycols, ethane-1,2-diol, propane-1,2-diol and propane-1,2,3-triol.

18. A composition as claimed in claim 1 wherein said composition contains a propellant selected from the group consisting of propane, butane, dimethyl ether and carbon dioxide.

19. A composition as claimed in claim 1 wherein said composition is free of halogenated organic solvents.

20. A composition as claimed in claim 1 having a solids content of from 40% to 60% by weight of said composition.

21. A composition as claimed in claim 1 having a solids content of from 50% to 55% by weight of said composition.

22. An antislip composition comprising: from 35 to 45% by weight of a water-soluble, saponified rosin, from 5 to 10% by weight of an alcohol selected from the group consisting of ethane-1,2-diol, propane-1,2-diol and propane-1,2,3-triol, from 5 to 10% by weight of a liquefying agent selected from the group consisting of alkali metal alkyl benzenesulfonates containing up to 8 carbon atoms in the alkyl chain and alkaline earth metal alkyl benzenesulfonate containing up to 8 carbon atoms in the alkyl chain, from 15 to 25% by weight of dimethyl ether, from 0.5 to 5% by weight of at least one water-soluble polymer comprising starch, starch derivatives, dextrin, polyurethane, or cellulose ethers, and the balance water.

23. A method of treating an article comprising applying to at least one surface of said article a coating of a composition as claimed in claim 1 and allowing said composition to dry after said coating.

24. The method as claimed in claim 23 wherein said article has a plastic surface.

25. The method as claimed in claim 24 wherein said plastic is selected from the group consisting of polystyrene, polycarbonate, polyvinyl chloride, polyethylene, polypropylene and polyethylene terephthalate.

26. The method as claimed in claim 23 wherein more than one of said articles is coated and the articles are stacked on top of one another wherein the coated surfaces are brought into contact after drying of said composition.

* * * * *